July 11, 1933.  P. VAN H. WEEMS  1,917,278
LINE OF POSITION AND WIND DRIFT PLOTTER
Filed Feb. 8, 1932

INVENTOR
P. V. H. Weems.
BY
ATTORNEY

Patented July 11, 1933

1,917,278

UNITED STATES PATENT OFFICE

PHILIP VAN HORN WEEMS, OF THE UNITED STATES NAVY

LINE OF POSITION AND WIND DRIFT PLOTTER

Application filed February 8, 1932. Serial No. 591,659.

(GRANTED UNDER THE ACT OF MARCH 3, 1883, AS AMENDED APRIL 30, 1928; 370 O. G. 757)

This invention relates to a navigation instrument, and particularly to an instrument for air navigation.

The object of this invention is to provide a simple and convenient device for showing the course and distance made good by an aircraft and also for plotting the line of position of such craft.

With the above and other objects in view, the invention consists in the construction, combination and arrangement of parts as will be described more fully hereinafter.

Figures 1, 2:
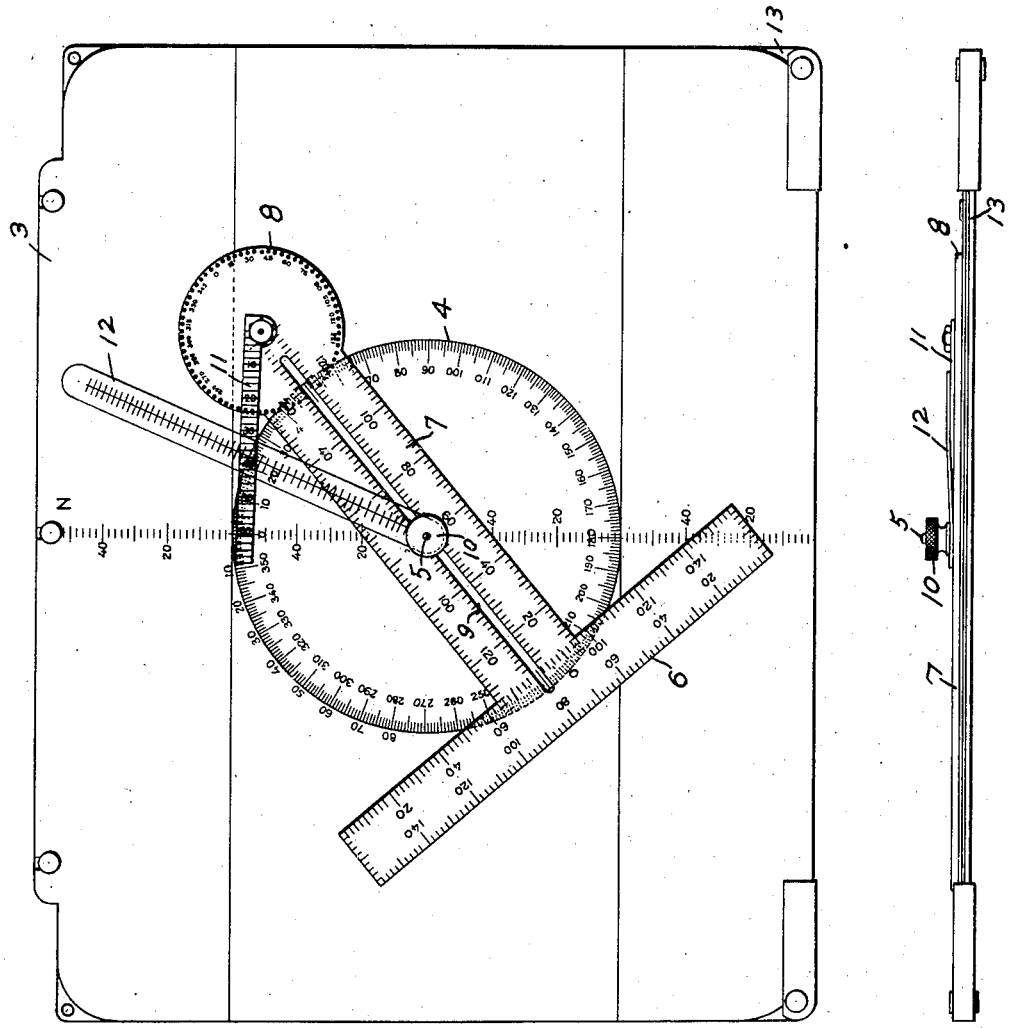
Fig. 1 is a plan view of my invention.
Fig. 2 is a side elevational view thereof.

Basically, the only constructions used on a navigation chart are for directions and distances. My present invention is designed to facilitate the plotting of direction and distance for all the problems required for sea and air navigation. It is intended for use with a universal chart.

The chart 3 having a compass rose 4 is mounted on chart board 13. A threaded stud 5 on the board extends through the center of the rose. The instrument consists essentially of a T-scale having a calibrated head 6 and a calibrated longitudinally slotted blade 7 with a graduated protractor 8 at the end of the blade. The instrument is placed with stud 5 extending through slot 9 in the blade and is held fixed in any desired position by thumb nut 10 screwed upon the stud. A calibrated wind velocity arm 11 has one end pivoted at the center of protractor 8. The scale spacings on the T-scale and the wind arm are equal. A second arm 12, calibrated to the same scale as the wind arm, is pivoted on stud 5 under the thumb nut.

The course and distance made good are determined as follows: The slot 9 is set to the course steered, say 50°, and the air speed is represented to scale by the distance between the center of the protractor 8 and stud 5 which is shown as 80 knots in the drawing. Wind arm 11 is set at an angle to slot 9 equal to the angle between the course steered and the direction of the wind. Arm 12 is then set with its center line intersecting substantially the mid-point of the scale mark on wind arm 11 representing the wind speed. The distance from stud 5 to the above-mentioned intersection represents the distance made good, and the direction of the center line of arm 12 shows the course made good.

In plotting a line of position, the slot 9 is turned in the direction of the bearing and the line of position is drawn along head 6 at right angles thereto. The T-scale may be moved toward or away from the assumed position by a distance representing the altitude difference.

It will be understood that the above description and accompanying drawing comprehend only the general and preferred embodiment of my invention, and that various changes in the construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon.

I claim:

1. In combination with a chart board having an upstanding stud thereon, a T-scale having a head and a longitudinally slotted blade, both said head and said blade being calibrated to the same scale and the slot in said plate being adapted to receive said stud, a protractor carried by the free end of said blade, a wind arm calibrated to the said same scale and having one end pivoted at the center of said protractor, a second arm calibrated to the said scale and having one end pivoted on said stud, and means engageable with said stud to fix said T-scale in position.

2. In a navigation instrument, a T-scale having a head and a longitudinally slotted blade, both said head and said blade being calibrated to the same scale, a protractor carried by the free end of said blade, a wind arm calibrated to the said same scale and having one end pivoted at the center of said protractor, and a second arm calibrated to the said scale and adapted to have one end pivoted on a member slidable in the slot in said blade.

PHILIP VAN HORN WEEMS.